United States Patent [19]

Nordling et al.

[11] 3,778,555

[45] Dec. 11, 1973

[54] TELEPHONE SUBSCRIBER LINE SYSTEM INTRA CALL APPARATUS AND METHOD

[75] Inventors: K. Fredrik Nordling, Sonoma; Samuel T. Huey, Larkspur, both of Calif.

[73] Assignee: Digital Telephone Systems, Inc., San Rafael, Calif.

[22] Filed: July 19, 1971

[21] Appl. No.: 163,669

[52] U.S. Cl. .............................................. 179/18 FC

[51] Int. Cl. .............................................. H04q 3/60

[58] Field of Search .................... 179/18 FC, 18 AG, 179/18 AH, 18 AB, 18 EA, 18 E, 18 GC, 175.2 C, 175.24, 18 FA, 8 A

[56] References Cited

UNITED STATES PATENTS

| | | | |
|---|---|---|---|
| 3,692,948 | 9/1972 | Warner | 179/18 FA |
| 3,352,974 | 11/1967 | Minchenko | 179/8 A |
| 3,250,859 | 5/1966 | Fisher | 179/18 FC |
| 3,198,887 | 8/1965 | Brooks et al. | 179/18 FC |
| 3,462,557 | 8/1969 | Brooks et al. | 179/18 FC |
| 3,433,901 | 3/1969 | Reinig | 179/18 FC |
| 3,530,255 | 9/1970 | Dagnall, Jr. et al. | 179/18 AH |
| 2,755,340 | 7/1956 | Oberman | 179/18 GC |
| 2,895,012 | 7/1959 | Liston et al. | 179/18 AB |
| 3,484,559 | 12/1969 | Rigby | 179/18 E |
| 3,525,816 | 8/1970 | Herter | 179/18 FA |

*Primary Examiner*—Thomas W. Brown
*Attorney*—Karl A. Limbach et al.

[57] ABSTRACT

Intra-calling capability is provided at the remote unit of a telephone subscriber line system (SLS). When a subscriber calls another subscriber on the same SLS he initially goes "off-hook," receives one of the carrier trunks, dials, and the switching network at the serving central office in turn applies ringing to the station being called. If this station is served by the same SLS, a transfer of the call will be made to an intra link upon answering of the called subscriber, thus leaving the two trunk carrier channels for use by other subscribers. The lines of the two subscribers on the intra link appear busy at the central office. Should all the intra links be in use, the system still permits two subscribers on the same SLS to continue their use of two trunks. There is no numbering restriction placed on the lines.

18 Claims, 8 Drawing Figures

INVENTORS
SAMUEL T. HUEY
K. FREDRIK NORDLING

Limbach, Limbach & Sutton
ATTORNEYS

INVENTORS
SAMUEL T. HUEY
K. FREDRIK NORDLING

BY Limbach, Limbach & Sutton

ATTORNEYS

INVENTORS
SAMUEL T. HUEY
K. FREDRIK NORDLING
BY Limbach, Limbach & Sutton
ATTORNEYS INVENTORS
SAMUAL T. HUEY
K. FREDRIK NORDLING
BY Limbach, Limbach & Sutton
ATTORNEYS

TELEPHONE SUBSCRIBER LINE SYSTEM INTRA CALL APPARATUS AND METHOD

BACKGROUND OF THE INVENTION

This application relates to a telephone subscriber line system (or line concentrator system) and more particularly to apparatus and a method for detecting and providing an intra call capability in such a system.

Subscriber line systems or line concentrator systems are encountered when the demand for telephone service in rapidly growing areas outstrips the number of trunks between the particular area and the serving central office. Thus to meet service demands by a number of subscribers larger than the number of trunks available a sharing of trunks among subscribers is provided. Such sharing arrangements are based on a knowledge of the calling habits of the subscribers to be serviced. By choosing a small enough concentration ratio (of subscribers to trunks) the probability of blocking (a subscriber being unable to secure a trunk) is reduced to a satisfactory level. However, large concentration ratios are economically desirable by the system operator.

One problem with subscriber concentrators is that as the community of interest grows more local calls are made between subscribers located within the same remote concentrator system. This results in a double loading on the system for a single telephone call, i.e., a trunk to the central office for the calling subscriber and a second trunk from the central office for the called subscriber. Consequently, the probability of blocking is greatly increased, resulting in loading with less than the full number of subscribers causing not only customer dissatisfaction but a significant economic penalty to the operator of the system. This problem is overcome by the provision of the intra call feature which detects calls between subscribers in the same SLS and makes a connection at the remote unit thus freeing the two trunks for use by other subscribers. This feature is provided without requiring special number allocation to the lines.

In one preferred embodiment, the present invention is used in the SLS employing a pulse code modulation (PCM) carrier link. The system is compatible with a conventional PCM repeater line connection such as the familiar T1 type. However, the system may be used with any data transmission mode including microwave link, data set, etc. It will be apparent to those of ordinary skill in the art, that the invention may be applied to virtually any type of subscriber line system. Thus, although the invention will be described in one particular environment in order to provide a complete disclosure of the invention, it is to be understood that it is not to be limited to use in this particular environment.

The remote end of the SLS including a switching matrix to allow the use of 24 carrier channels or trunks by 96 subscriber lines. The 24 trunk outputs from the switching matrix are applied to a time division PCM multiplexer that applies the PCM carrier signal to the T1 line. A particular subscriber has access to a restricted number of trunks; four or six typically (suitable for low and high usage, respectively). Access to the same set of trunks is restricted to a maximum of three other subscriber lines. Essentially random access is provided to any of the preselected trunks which may be available for service to a particular subscriber. This is based on the random time a service request occurs relative to the continuous searching process of the equipment. Should one of the channel trunks be out of service, due to component failure, and if this condition is not recognized, the subscriber on remaking the call has a high degree of probability of obtaining a second trunk which would be operating normally. This is an advantage not shared by conventional subscriber carrier systems in which a subscriber has access to only one trunk.

At the central office a switching matrix similar to the remote matrix is used to provide the output of each subscriber line on a unique pair of lines. This approach permits the SLS to be inserted between the main distribution frame and the subscribers, permitting easy application, and provision is made to allow the normal automatic number identification systems and billing procedures to be followed. In fact, the system causes the input of the SLS at the central office equipment to look and behave as though a subscriber were actually connected by an individual pair of wires in the normal way. However, the variable losses characteristic of a varying distance to a subscriber, or the varying gages of cables to a subscriber, will not be present. The level of variation will be determined primarily by the relatively small variation characteristics of the link between the remote unit SLS and the subscriber rather than by the total distance to the central office.

It is quite conceivable that a remote community could be served by a central office fifty miles away. At the same time, the SLS is economically viable at very short distances.

The switching system is closely integrated with the carrier system, but the principle may, of course, be applied without such integration with a carrier system. The switching network at either end is controlled from the SLS central office equipment. The initiation of the allocation of the trunk to a subscriber line may occur from either end, by the subscriber going 'off hook' or alternatively by the incoming call to the subscriber causing ringing at the input to the SLS central office equipment. In either case, a trunk channel is rapidly allocated on the basis of a predetermined logic.

The integration of switching control with the carrier is made possible by the use of PCM technology, which permits very economical transmission of vast amounts of data from one end of the system to another and back. The SLS system takes advantage of this data transmission capacity by placing the control and monitoring circuitry at the central office end of the system and using data links to convey commads to the remote switching network and to relay the status of the remote subscriber to the control circuits. This results in the complex circuitry operating in a better temperature environment and with greater accessibility for maintenance personnel. An additional advantage is that because the status of the system can be maintained and controlled from one end, sophisticated maintenance, control, and traffic monitoring equipment can be built in or connected to it. The PCM system referred to is compatible with repeater lines which have a basic capacity of 1.5444 megabits per second. Of these, seven-eighths of the capacity, namely seven digits of each eight, are allocated to the transmission of the voice signals. The eighth digit is used for many data and switching functions as required. The particular allocation of bits is somewhat arbitrary and variation is possible.

SUMMARY OF THE INVENTION

In a subscriber line system requiring concentration there is a significant traffic advantage if intra link circuits are provided when there is a significant community of interest between the users. In the system described this provision is made by transferring subscribers to the intra link following initial establishment of the call by the central office switching equipment. The system described has the advantage that no special numbering system or programmed recognition circuits are required. Sensing of the intra call is provided at a trunk rather than a line level. Use is made of a MOS memory system that records the condition of every cross point in the switching matrices.

The remote and central office matrices are quite similar. For example, a pair of cross points that are linked at the remote end are "busied out" at the central office.

Intra call facilities provide a local connection between two subscribers served by the same system. Since no trunks are used when such a connection is established there is a substantial traffic advantage.

The system described uses trunks and central office equipment to set up the call, but then transfers it to an intra call link circuit in the remote terminal. This use of trunks and central office equipment for a short interval of time does not materially affect the advantage of using intra links, but results in the benefit that no special numbering system or programmed recognition circuits are required. The system is "transparent;" it looks like a wired connection as far as the subscriber and central office are concerned which simplifies application.

Intra call sensing is accomplished by monitoring the subscriber line system trunks at the central office end of the system. Each trunk is sequentially scanned and a latch unique to each trunk is set when a subscriber has gone off hook in response to ringing (the called party). After a fixed delay period, a tone is applied to a bus common to all trunks; however, the tone will be applied only to the trunk on which the latch is set. If an intra call is taking place the tone will also be present on the trunk of the calling party. Each trunk is sequentially scanned for the tone; if the tone is found and verified to be close in frequency to the original tone, the memory takes note of the trunk having the tone. The memory knows which line is connected to each trunk, hence the calling line is known. The tone is then removed and the trunks are scanned to find the latched trunk connected to the called line and that information is given to the memory which then knows the called line. The memory then completes the intra link at the remote subscriber unit freeing the two trunks. If an intra call is not present no tone would be detected and the latch would be reset without the setting up of an intra link.

DESCRIPTION OF THE PREFERRED EMBODIMENT

Figure 1:
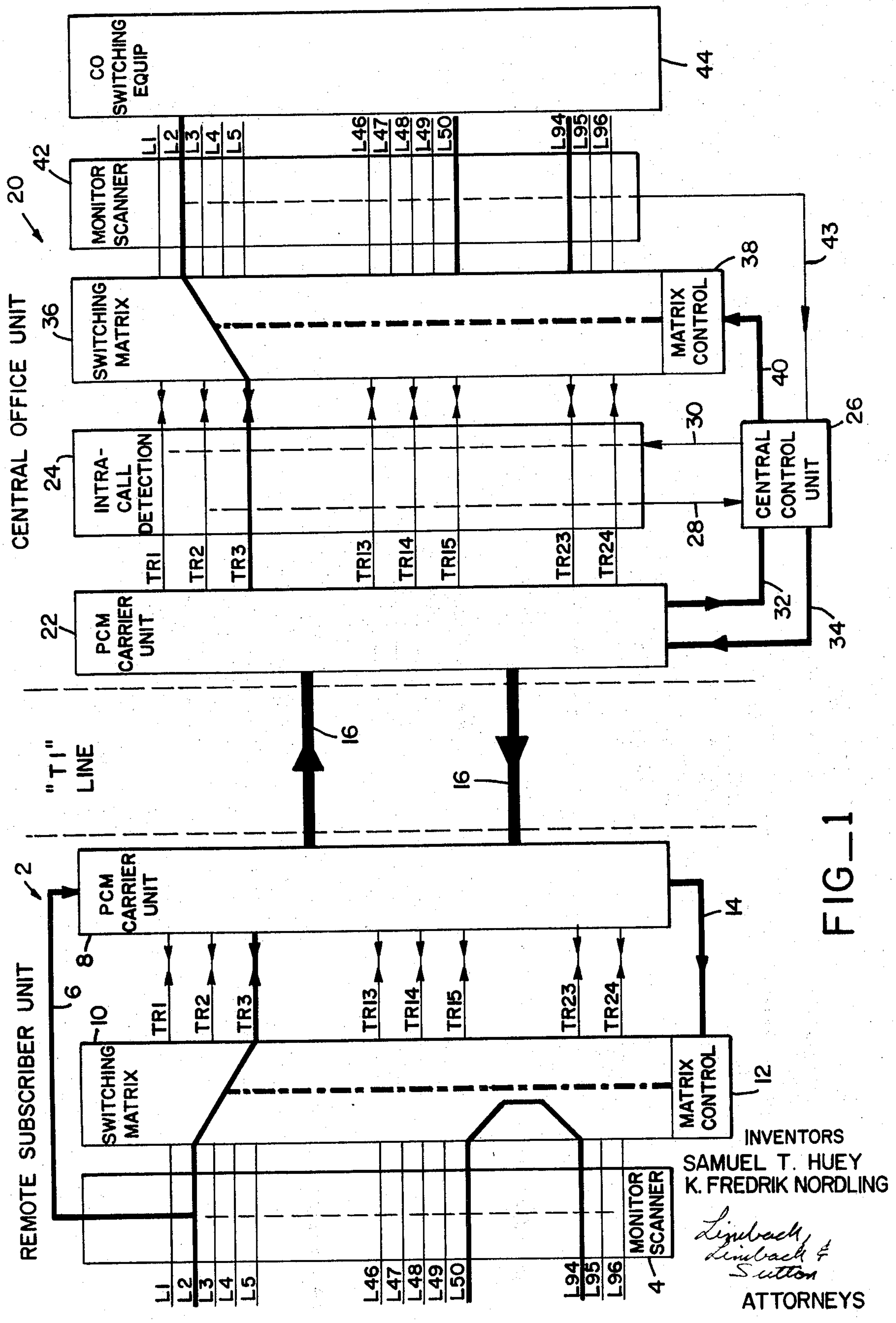
FIG. 1 is a block diagram of the system environment of the present invention.

Referring now to FIG. 1 wherein a block diagram of the basic subscriber line system is shown. It is to be understood that the specific numbers of trunks, lines, etc. are exemplary. A remote subscriber unit 2 has 96 incoming subscriber lines L1 – L96 applied to a monitor scanner unit 4. Monitor scanner unit 4 sequentially scans each subscriber line and provides a signal on line 6 to a PCM carrier unit 8 as to the condition of each line. Switching matrix 10 can connect each subscriber line L1 – L96 to one of a set of trunks in the group of trunks TR1 – TR24. Typically, each line has access to 4 or 6 particular trunks and not more than three other lines have access to the same set of trunks. Matrix control 12 receives a signal on line 14 from PCM carrier unit 8 instructing it as to which cross point connections to make in the matrix.

The trunk outputs TR1 –TR24 from switching matrix 10 are applied to the PCM carrier unit 8 which time division multiplexes them onto a T1 line 16 and demultiplexes the received signal from the T1 line 16. If an 8-bit word is used, the first seven bits may be used to carry voice information and the eighth bit may carry "housekeeping" data including the information on line conditions received on line 6 and the matrix control information sent on line 14 in addition to conventional trunk signaling information.

At the central office 20 a similar PCM carrier unit 22 is connected to the T1 line 16 for interfacing with the trunk lines TR1 – TR24. An intra call detection unit 24 is connected across each trunk line. The details of this unit are set forth hereinafter. Suffice to say at this point that the unit 24 recognizes an intra call at the remote subscriber unit and communicates with a central control unit 26 over lines 28 and 30 regarding such an event. Central control unit 26 includes an MOS memory that contains information as to the status of every cross point in switching matrix 10 of the remote subscriber unit 2. Remote data is received via line 32 from the PCM carrier unit. Control unit 26 also originates the control signals for matrix control unit 12; these signals are applied to the PCM carrier unit 12 via line 34.

Trunks TR1 – TR24 from the intra call detection unit 24 are applied to a further switching matrix 36, which under the control of matrix control 38 conncets the trunks to 96 lines L1 – L96 that correspond to lines L1 –L96 coming into the remote subscriber unit 2. Matrix control 38 is operated by the central control unit 26 via line 40. A monitor scanner unit 42 scans lines L1 – L96 to provide data as to their status to central control unit 26 over line 43. The output lines L1 – L96 from the monitor scanner 42 are applied to the central office switching equipment 44 as though they came directly from the subscribers.

The details of the PCM carrier units 8 and 22, switching matrices 10 and 36, monitor scanners 40 and 42 and central control unit 26 are within the present knowledge of those of ordinary skill in the art and are therefore not set forth here so that the invention may be presented clearly and concisely.

The block diagram shows a subscriber having placed a telephone call on line 2 to somewhere outside the remote subscriber unit. Line 2 is connected to trunk TR3 by switching matrix 10 and is time division multiplexed as a PCM signal onto the T1 line 16 to the central office unit where it is converted back to a voice signal on trunk TR3 and connected to line L2 by switching matrix 36 for application to the central office switching equipment 44. Also shown is an established intra link between lines 50 and 94 through switching matrix 10. Lines 50 and 94 are shown as busy by switching matrix 36 for the information of the central office switching equipment 44.

Figure 2:
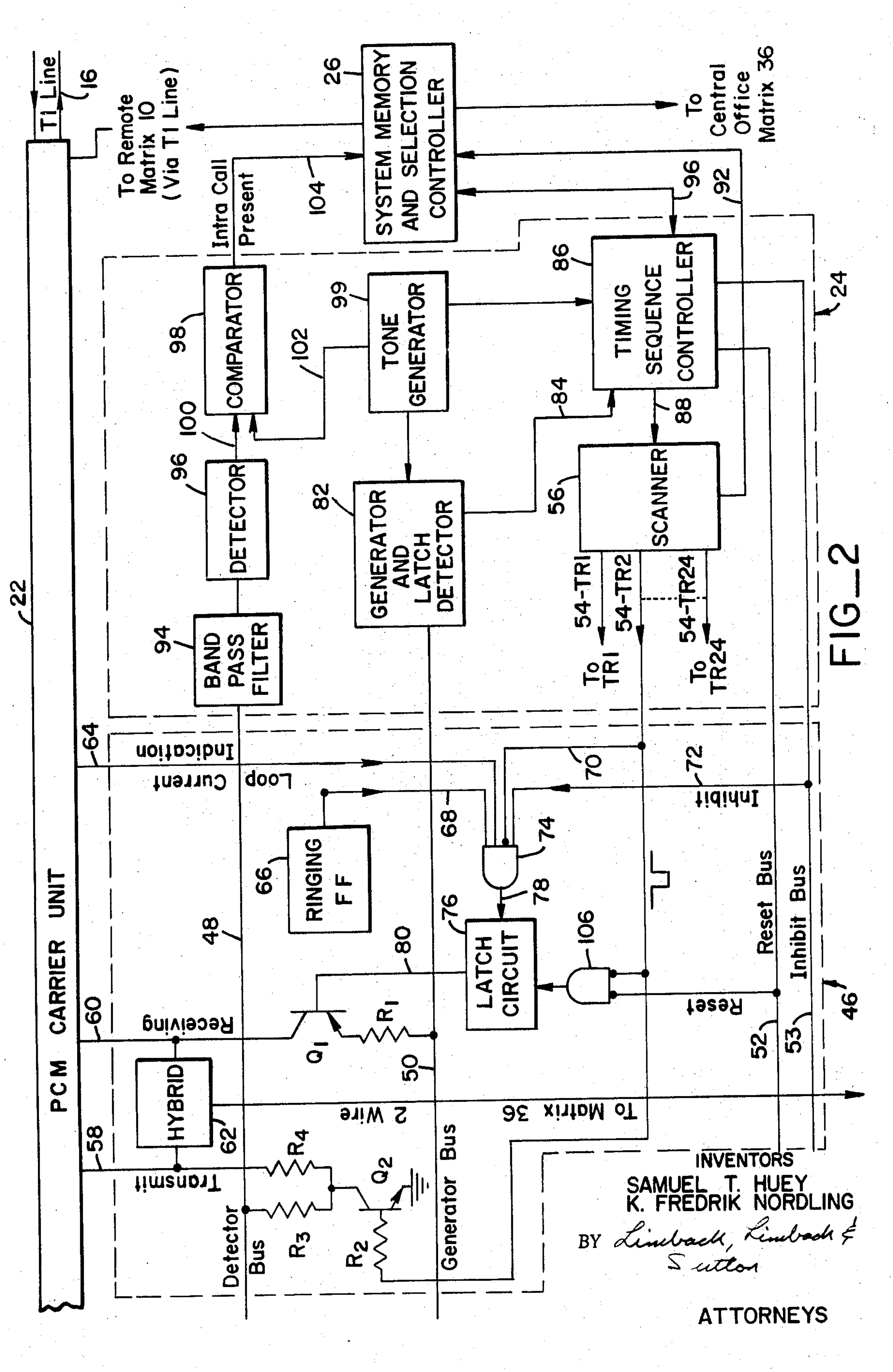
FIG. 2 is a partially schematic block diagram showing a portion of one embodiment of the present invention.
Figure 3A:
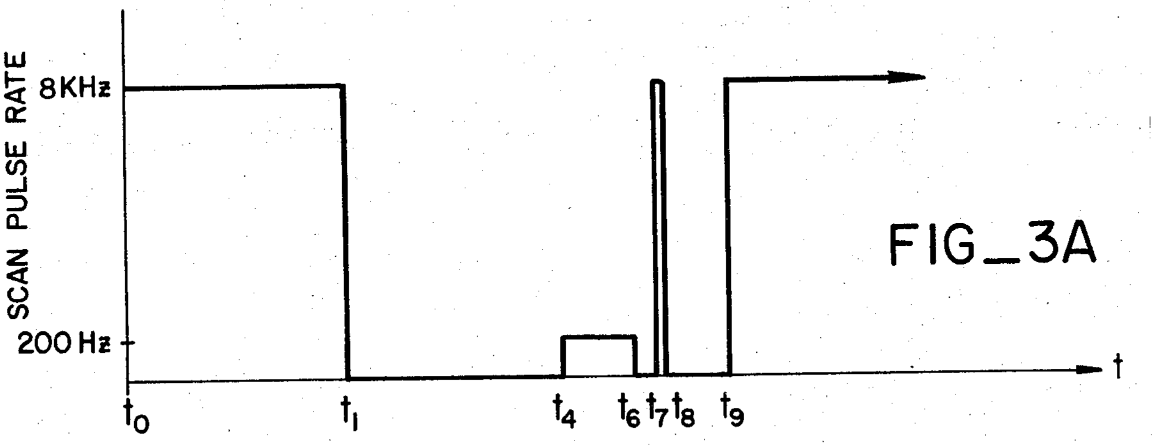
FIGS. 3A – 3C are a graphical presentation of timing waveforms useful in understanding the present invention.
Figure 3B:
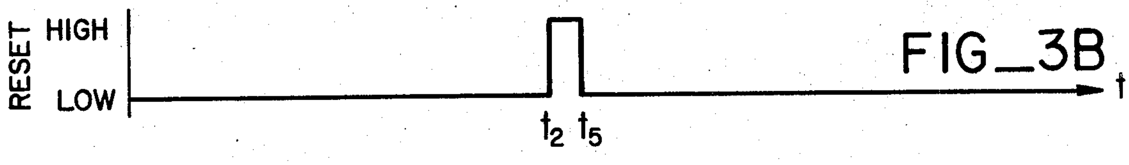
Figure 3C:
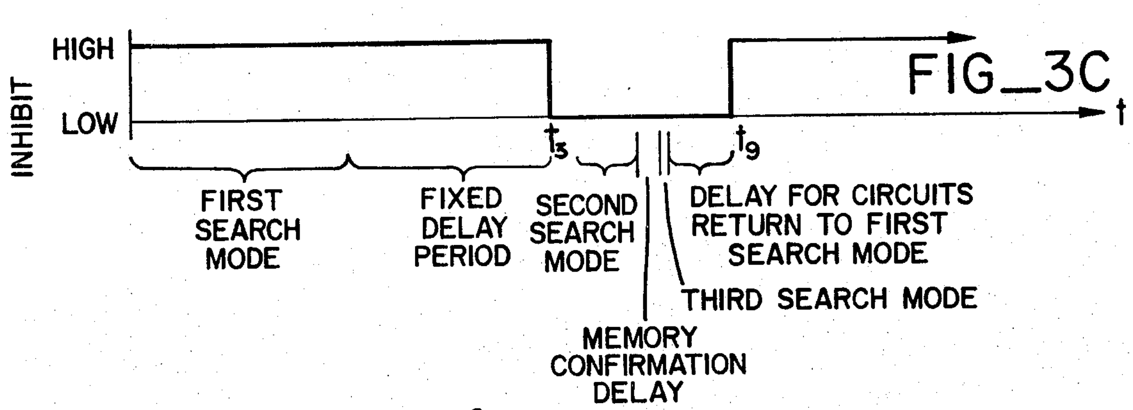

Referring now to FIG. 2, details of the intra call detection unit 24 and associated circuitry are shown in conjunction with the timing diagrams of FIGS. 3A – 3C. FIG. 2 shows unit 24 in connection with a single trunk TR2 for simplicity; the same arrangement is made with the remaining 23 trunks. Each trunk has circuitry associated therewith such as that shown within dashed block 46 for trunk TR2. Four sets of lines, a detector bus-line 48, a generator bus-line 50, a reset bus-line 52, and an inhibit bus-line 53 from intra call detection unit 24 are common to all 24 trunk circuits. A scan pulse line 54-TR1 through 54-TR24 from a scanner unit 56 in intra call detection 24 is unique to each trunk circuit.

Each trunk circuit 46 has a transmit line 58 and receive line 60 connected to the PCM carrier unit 22. Lines 58 and 60 are applied to a hybrid 62 for interfacing to a two wire line to switching matrix 36. Trunk circuit 46 also receives a loop current indication signal over line 64 from PCM carrier unit 22 that indicates when a subscriber is off hook. When a subscriber at the remote unit 2 goes off hook a high signal is present on line 64. If the subscriber went off hook in response to ringing, a flip-flop 66 is set causing a high signal on line 68. Scanner 56 in the intra call detection unit 24 sequentially puts a scan pulse on lines 54-TR1 to 54-TR24 at the rate of 8KHz, for example, during the first search mode when the unit is looking for trunks connected to lines that have gone off hook in response to ringing. Thus, when line 54-TR2 is pulsed, line 70 goes low. Line 72 is always high unless inhibited as explained hereinafter. Thus, when lines 64, 68, and 72 are high and 70 is low, the AND gate 74 sets a latch circuit 76 over line 78. This set condition causes timing sequence controller 86 to stop the scanning by scanner 56. When latch 76 is set it causes $Q_1$ to draw current through $R_1$ and to act as a linear amplifier. Current is thus drawn on the generator bus line 50. Detector 82 senses the current flow that indicates the latch set and provides a signal to controller 86 to stop the scanning as mentioned above. Thus at time $t_1$ in FIG. 3A, the scanning stops in response to an off hook by a called party. Further action is delayed for a fixed time from $t_1$ to $t_2$, for example 150 to 450 ms., to permit switching transients to settle in the central office equipment and to permit the connection between subscribers to be made through the central office equipment. If the set signal on line 78 remains at the end of the time delay period $t_2$, the latch 76 will be "permanently" set; if the set signal is not present at $t_2$ , the latch will be reset by the reset signal on line 52. Since the scanner 56 has stopped at line 54-TR2, hence there is potentially a full complement of inputs to AND gates 74 and 106. If, for example, loop current on line 64 is not present at $t_2$, then there will be no set signal on line 78 and the output of gate 106 will reset the latch circuit and the first scanning mode will resume.

Figure 4:
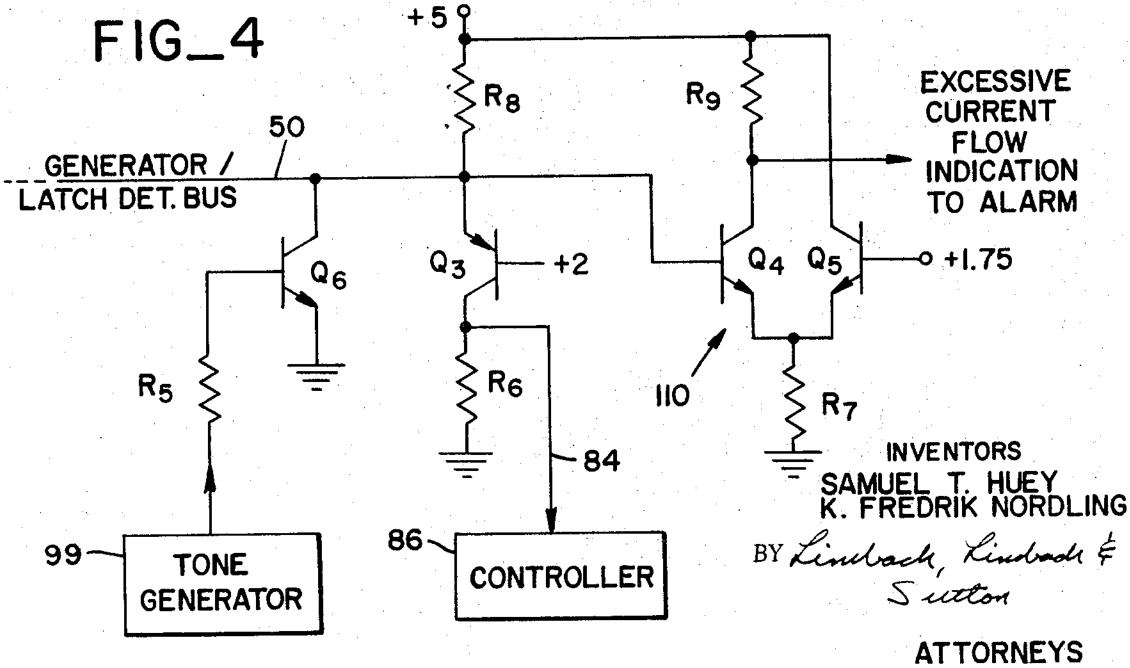
FIG. 4 is a schematic circuit diagram showing details of the generator and latch detector of FIG. 2.

A generator and latch detector 82, shown in detail in FIG. 4, senses the current flowing through $Q_1$. A signal is provided on line 84 by generator and latch detector 82 to controller 86 that removes the high signal from the inhibit bus, line 53, at time $t_3$, to prevent the setting of latch circuits associated with any other trunk. Controller 86 transmits a code word to the control unit or system memory and selection controller 26 over line 92 indicating on which trunk channel the latch occurred. Unit 26 knows which trunks and lines are connected, hence the line is known.

The reset signal on line 52 is raised from low to high from $t_2$ to $t_5$ before the inhibit bus 53 goes low, to allow latch 76 to remain set.

A tone generator 99 provides a signal at a first frequency on line 50 beginning at time $t_4$, the commencement of the second search mode. When $Q_1$ draws current and acts as a linear amplifier, the tone is applied to hybrid 62 and then to the two-wire line representing the trunk going to matrix 36. The tone signal generated is a square wave signal at 16,000 Hz, for example. In this second search mode, the trunk connected to the calling subscriber's line is being hunted by looking for the tone signal at each trunk.

The time lapse between $t_2$, $t_3$ and $t_4$ is very short.

Once the time delay from $t_1$ to $t_4$ has elapsed, a signal on line 88 causes the scanner to resume scanning at $t_4$, but at a slower rate, 200 Hz, for example, in the second search mode. A pulse is applied on each line 54-TR1 through 54-TR24 sequentially for 5 milliseconds each, for example. A scanning pulse opens the normally conducting transistor $Q_2$ to permit the signal from the transmit port of each trunk channel hybrid 62 to be applied over detector bus, line 48 to the intra call detection unit 24. The signal is applied to a band pass filter 94 that has a very low input impedance at voice frequency thus eliminating possible crosstalk through the transistor gates. The sIgnal from filter 94 is a sine wave due to the effects of the circuitry on the original 16,000 Hz square wave. The signal is applied to a detector 96 that is an amplifier and Schmitt trigger threshold circuit to provide a square wave output if the signal exceeds a minimum amplitude to the digital frequency comparator 98 on line 100 that also receives the original tone signal on line 102. Comparator 98 is shown in more detail in FIG. 5. If the two signals on lines 100 and 102 are sufficiently close in frequency a verification procedure is initiated which requires tone generator 99 to transfer to a higher frequency, 18,286 Hz for 5 ms., for example, followed by return to the lower frequency for 5 ms. If the verification is positive, an intra call present signal is sent to controller 26 via line 104. Controller 26, implemented with MOS arrays, contains the line number connected to any trunk that is in use. Controller 26 via line 92 causes scanner 56 to halt at time $t_6$ upon receipt of the intra call present signal. The scanner reads out the trunk at which the intra call tone has been detected over line 92 from $t_6$ to $t_7$. Thus the memory/controller 90 knows which trunk and consequently which line is the calling party half of an intra call. Unit 26 then sends a command to the remote unit switching matrix 10 to transfer the calling line at the remote end to an intra link, which supplies power and voice path for the subscriber involved. When this is accomplished the central office equipment receives confirmation of the control signal being successfully executed at the far end, a matter requiring typically a few milliseconds, 10.5 to 40 ms., for example, from $t_6$ to $t_7$. The memory and selection controller 26 then gives a command to the intra call controller 86 to search for the trunk which initiated the process, i.e. the trunk connected to the called line. This is the third search mode, from $t_7$ to $t_8$ that requires a very brief time period, 3 ms., for example. The search is made by having the scanner 56 scan on line 54-TR1 to 54-TR24 at the high rate, 8 KHz, for example. The called trunk is unique in that it has a latched condition within its unique memory. When the latched trunk is reached by the pulse, the latch is reset by having the low pulse and the low reset signal applied to AND gate 106. This resetting function is detected on the common generator bus as $Q_1$ ceases to conduct and thus, by means of detection of its removal, the scanning clock is stopped at $t_8$. This second stopping of the scanning clock of the intra call detector is presented to the central memory control 26 and a somewhat similar process is now initiated in that the called line is transferred from the original trunk used to set up the call to the same intra link that was used for the calling line. At this point in time, a direct connection is now established at the remote end and following a short interval both trunks are released for service of other lines. After this time delay, at $t_9$, the inhibit signal returns to high and the first search mode is resumed. When transfer of a line to an intra link is made, the line so transferred is made busy at the central office by signaling an off hook condition for that line. When the intra link ceases to be used, as indicated by the remote subscribers going on hook, this condition is recognized and transmitted to the central office selection and memory logic 26. The matrix connections to the link are then removed and the line busy relays in the central office are released.

In the event that the apparent detection of party going off hook in response to ringing (a called party) is momentary due to errors in transmission for example, latch circuit 76 will not stay latched and no search action will be initiated. A signal must be present on line 78 at both $t_1$ and $t_2$ for latch 76 to remain set. If the party called is not called by a party in the same subscriber line system, the intra call present signal will not occur on line 104 and an intra link will not occur. Latch 76 will be reset during the third search mode and the system returns to the first search mode.

Referring now to FIG. 4, details of the generator and latch detector 82 are shown. The detector bus 48 is connected to the collector a NPN switching transistor $Q_6$, to the emitter of a PNP switching transistor $Q_3$ and to the base of a NPN transistor $Q_4$ that forms one-half of a differential amplifier 110. The base of $Q_6$ is connected to tone generator 102 through a coupling resistor $R_5$. $Q_3$ has a positive voltage, for example, 2 volts, applied to its base. The collector of $Q_3$ is connected to ground through a biasing resistor $R_6$ and to controller 86 via line 84. Detector bus, line 48 is connected to a positive voltage, for example, 5 volts through a resistor $R_8$. The voltage is also connected to the collector of $Q_5$, the second half of differential amplifier 110 and through a resistor $R_9$ to the collector of $Q_4$. The emitters of $Q_4$ and $Q_5$ are connected together to ground through a resistor $R_7$. The base of $Q_5$ has a positive voltage, 1.75 volts, for example, applied to its base. The collector of $Q_4$ may be monitored for excessive current to indicate system failures as explained below.

The generator detector bus has three distinct functions. First, the setting of the latch circuit places a ground on the base of $Q_1$ (FIG. 2). This causes current flow from $R_8$ in the common circuit through $R_1$ and $Q_1$ to the hybrid. This current flow causes current through $Q_3$ to cease, giving an output signal to the controller 86 which initiates the intra call search procedure described hereinbefore.

The second function of the generator latch detector bus is to distribute the intra call test signal to the trunk circuit which has a set latch condition. This is accomplished simply by closing a switch, $Q_6$ at the desired signal frequency; $Q_6$ functions as a saturated switch. This modulates current flow through $Q_1$, and thus into the hybrid.

The third function is to detect faults in the trunk intra call circuits. Two possible equipment fault conditions which would cause spurious transfer are more than one latch being set concurrently, or one of the gate transistors, such as $Q_1$ failing. These conditions cause greater current flow through $R_8$. The differential amplifier $Q_4 - Q_5$ senses the increased voltage drop, triggering alarm circuits. During tone generation, the alarm output is inhibited. Thus, three important functions are combined in a single bus line 58, and simple common circuit.

Figure 5:
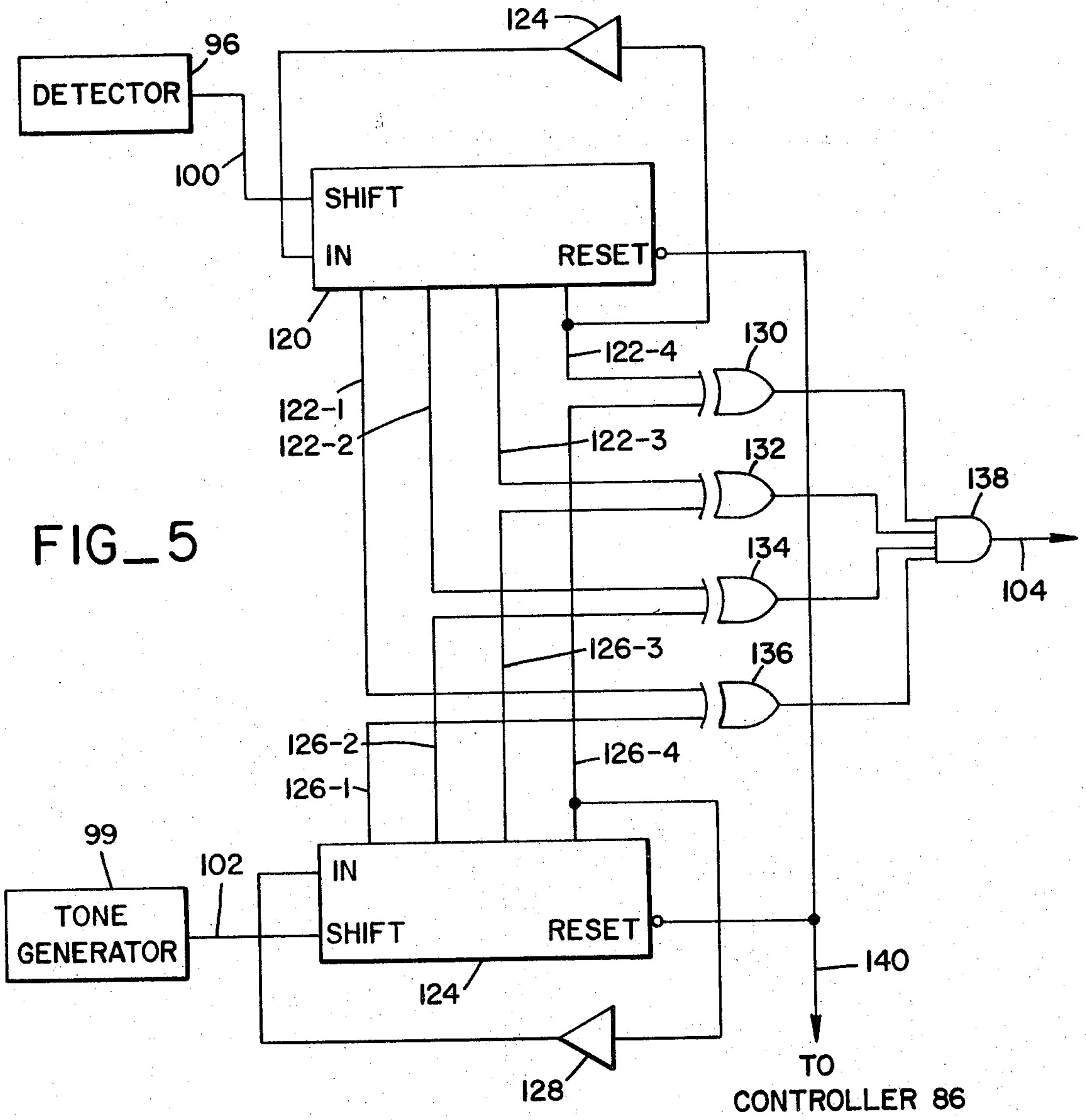
FIG. 5 is a partially block schematic circuit diagram showing the digital tone frequency comparator of FIG. 2.

Details of the digital frequency comparator 98 are shown in FIG. 5. A pair of shift registers 120 and 124 are arranged as twisted ring counters. The square wave output of detector 96 is applied over line 100 to the shift input of register 120. A four bit output is provided on lines 122-1, 122-2, 122-3 and 122-4. Line 122-4 is applied through an inverter 124 back to the input of register 120. In like manner, register 122 receives the square wave output of tone generator 99 via line 102 to its shift input. A four bit ouput is provided on lines 126-1 through 126-4. Line 126-4 is connected to the input of register 124 through an inverter 128. Four exclusive OR gates 130, 132, 134 and 136 receive at their inputs lines 122-4 and 126-4, 122-3 and 126-3, 122-2 and 126-2, and 122-1 and 126-1, respectively. The outputs of gates 130, 132, 134 and 136 are applied to the input of an AND gate 138. As will be explained below, the output of gate 138 goes high only if the frequencies from the detector 96 and the tone generator 99 are not within a certain proximity of each other; some tolerance is allowed. The absence of a high signal during the test period is recognized as an "intra call present" signal by controller 26 (FIG. 2).

Figure 5A:
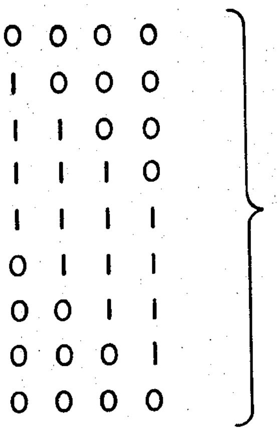
FIG. 5A is a binary logic table showing the contents of the shift register of FIG. 5.

In operation, at the beginning of each frequency comparison test period of 5 ms., for example, each shift register is reset to 0000 by controller 86 over line 140. The contents of each register changes as shown in FIG. 5A each time a register is shifted by a cycle of the square wave input on lines 100 or 102. An exclusive OR gate has a high output only when each input is different, thus for all the gates 130, 132, 134 and 136 to be high the counts in registers 120 and 124 must be completely out of phase, such as 0000 and 1111, a difference of four counts. Only when such a difference occurs will the AND gate 138 go high indicating a failed test. Thus, a difference of up to three counts is permitted over the test period, permitting some tolerance in frequency that may arise due to circuit effects.

The use of a digital frequency comparator permits the utilization of inexpensive solid state logic components. Also, only a single band pass filter, amplifier and trigger is required.

Although the invention has been described in terms of a single embodiment, it will be apparent to those of ordinary skill in this art that many modifications of the invention are possible without departing from the spirit of the invention. The invention is therefore to be limited only by the scope of the appended claims.

We claim:

1. In a telephone subscriber concentrator system having a remote unit connecting a group of subscriber lines to a set of trunks connected to a central office unit, the central office unit providing a group of lines from said set of trunks corresponding to said group of subscriber lines, the central office unit including a memory unit containing information as to the connection of lines and trunks at said remote unit and central office unit, improved apparatus in said central office unit for detecting an intra call between a calling line and a called line at said remote unit wherein a trunk associated with the calling line at the remote unit is initially linked at the central office with a trunk associated with the called line at the remote unit comprising a. generator bus means selectively connectable to any one of said trunks, b. a plurality of first switch means connected respectively to each trunk and responsive to a control signal for selectively connecting said generator bus means to a respective trunk, c. a plurality of latch circuit means connected respectively to each trunk for applying a control signal to said first switch means to connect the respective trunk to said generator bus means when said trunk is the called trunk connected to a called line that is off hook in response to ringing, d. generator means for applying a detectable signal to said generator bus means when the latch circuit means connected to a trunk is applying a control signal, e. detector bus means connectable to any one of said trunks, f. a plurality of second switch means connected respectively to each trunk for selectively connecting said detector bus means to a respective trunk, and g. means connected to said detector bus means for detecting said detectable signal on said detector bus means when said detector bus means is connected to the calling trunk which is linked to said called trunk on which said detectable signal is applied.

2. The combination of claim 1 wherein said latch circuit means applies said control signal to the one of said first switch means connected to the called trunk in response to a pulse signal when said called trunk is connected to a line that is off hook in response to ringing, and the one of said second switch means connected to the calling trunk connects said detector bus means to a trunk in response to a pulse signal, and further comprising pulse scanning means for sequentially applying a pulse signal to each of said latch circuit means and each of said second switch means.

3. The combination of claim 2 wherein said generator means comprises means connected to said generator bus means for sensing a connection between said generator bus means and a trunk and for providing a signal generator control signal in response thereto, and signal generator means for applying a detectable signal to said generator bus means in response to said signal generator control signal.

4. The combination of claim 2 wherein said signal detecting means comprises means connected to said detector bus means for comparing said signal received on said detector bus means to said signal applied to said generator bus means to generate a verification signal when said signals are close to each other in frequency.

5. The combination of claim 4 wherein said pulse scanning means comprises a plurality of lines connected respectively to each of said latch circuit means and each of said second switch means connected to each trunk, means for generating a train of pulses at a first repetition rate and at a second repetition rate slower than said first rate, said pulses applied sequentially to said plurality of lines, means for controlling the repetition rate of said pulse train generating means to provide pulses at said first rate until said sensing means senses a connection between said generator bus means and a trunk and to provide pulses at said second rate until said verification signal is generated.

6. The combination of claim 4 wherein said signal comparing means comprises band pass filter means connected to said detector bus means, threshold detector means connected to the output of said band pass filter means, and frequency comparing means receiving the signal from said threshold detector means and the signal applied to said generator bus to provide a verification signal when said signals are close to each other in frequency.

7. The combination of claim 6 wherein said signal generated by said signal generator means is a square wave signal and said threshold detector means provides a square wave output, and said frequency comparing means comparing said square wave signals comprises digital logic means.

8. The combination of claim 2 wherein said digital logic means comprises a first n-bit shift register having the square wave signal from said threshold detector means applied to the shift input thereof, a second n-bit shift register having the square wave signal from said signal generator means applied to the shift input thereof, a first inverter connected between the nth bit output and the input of said first register, a second inverter connected between the nth bit output and the input of said second register, n exclusive-OR gates each receiving the corresponding output lines of the first and second registers, and an AND gate receiving the outputs of said exclusive-OR gates.

9. In a telephone subscriber concentrator system having a remote unit connecting a group of subscriber lines to either a set of trunks connected to a central office unit or to an intra-link in the remote unit, the central office unit providing a group of lines from said set of trunks corresponding to said group of subscriber lines, the central office unit including a memory unit containing information as to the connection of lines and trunks at said remote unit and said central office unit, said central office having a data link to said remote unit, improved apparatus in said central office unit for detecting an intra-call and establishing an intra-link at said remote unit wherein a connection is initially made between a calling line and a called line at the remote unit via a first trunk connected between the remote unit and the central office, said first trunk connected to the calling line and designated the calling trunk, a link at the central office, and a second trunk connected between the remote unit and the central office connected to the called line and designated the called trunk comprising a. means including means for high speed DC scanning of said set of trunks for detecting the initial connection of a trunk to a called line, whereby said trunk is the called trunk,
b. means for applying a detectable signal to said called trunk, thereby applying said detectable signal to the calling trunk which is connected to said called trunk at the central office,
c. means for searching at a slow speed relative to said high speed DC scanning the remaining trunks in said set of trunks to detect said signal on said calling trunk to thereby identify said calling trunk,
d. means responsive to said detected signal and said memory unit for instructing said remote unit via said data link to connect said calling line corresponding to said calling trunk to said intra-link,
e. means including said means for high speed DC scanning of said set of trunks for identifying said called trunk and for instructing said remote unit via said data link to connect said called line corresponding to said called trunk to said intra-link, and
f. means for releasing said called and calling trunks.

10. The combination of claim 4 wherein said called line is a line that is off hook in response to ringing, and said means for detecting the initial connection of a trunk to a called line comprises a latch circuit means for providing a control signal when said trunk is connected to a line that is off hook in response to ringing.

11. The combination of claim 10 wherein said means for applying a detectable signal to a trunk comprises a. generator bus means selectively connectable to any one of said trunks,
b. switch means responsive to said control signal for connecting said trunk to said generator bus means, and
c. means for applying said detectable signal to said generator bus means.

12. The combination of claim 9 wherein said means for searching the remaining trunks comprises a. detector bus means selectively connectable to any one of said trunks,
b. means for sequentially connecting each of said remaining trunks to said generator bus means, and
c. detector means connected to said detector bus means for detecting said signal.

13. The combination of claim 12 wherein said means for applying a detectable signal includes signal generator means and wherein said detector means is connected to said generator means for comparing said signal detected on said detector bus means to said detectable signal applied to said generator bus means to generate a verification signal when said signals are within a predetermined frequency tolerance.

14. The combination of claim 11 wherein said means for identifying said called trunk comprises a. means for sequentially applying a disconnect signal to each of said means for connecting said trunk to said generator bus means, and
b. means for monitoring the current flow in said generator bus means for detecting a current change when the called trunk is disconnected from said generator bus means whereby the called trunk is identified.

15. The combination of claim 8 wherein said trunks are scanned about 8 thousand times per second.

16. In a telephone subscriber concentrator system having a remote unit connecting a group of subscriber lines to either a set of trunks connected to a central office unit or to an intra-link in the remote unit, the central office unit providing a group of lines from said set of trunks corresponding to said group of subscriber lines, the central office unit including a memory unit containing information as to the connection of lines and trunks at said remote unit and said central office unit, said central office unit having a data link to said remote unit, the improved method in said central office unit for detecting an intra-call and establishing an intra-link at said remote unit wherein a connection is initially made between a calling line and a called line at the remote unit via a first trunk connected between the remote unit and the central office, said first trunk connected to the calling line and designated the calling trunk, a link at the central office, and a second trunk connected between the remote unit and the central office connected to the called line and designated the called trunk comprising high speed DC scanning said set of trunks to detect the initial connection of a trunk to a called line, whereby said trunk is the called trunk,
applying a detectable signal to said called trunk, thereby applying said detectable signal to the calling trunk which is connected to said called trunk at the central office,
searching at a slow speed relative to said high speed DC scanning the remaining trunks in said set of trunks to detect said signal on said calling trunk to thereby identify the calling trunk,
instructing said remote unit via said data link to connect said calling line corresponding to said calling trunk to said intra-link,
identifying said called trunk and for instructing said remote unit via said data link to connect said called line corresponding to said called trunk to said intra-link, and
releasing said called and calling trunks.

17. Generator and latch detector apparatus connectable to a generator bus common to a plurality of trunks in a telephone system wherein connecting said bus draws current in relation to the number of trunks to which it is connected, comprising a current source connected to said bus,
means for detecting current flow in said bus, said means comprising
a transistor having its emitter collector path connected between said bus and resistor means grounded at the far end, said transistor having a DC voltage applied to its base, whereby said transistor ceases to conduct when current flows in said bus thereby changing the voltage potential at said resistor means, and means for applying a detectable signal to said bus, said means comprising square wave oscillator means, a transistor having its emitter base path connected between said bus and ground and having the output of said oscillator means applied to its base whereby said transistor operates as a saturated switch to ground said bus during one half-cycle of square wave signal.

18. The combination of claim 17 further comprising means for detecting current flow in said bus exceeding a predetermined amount indicating connection of said bus to more than one trunk, said means comprising differential amplifier means for comparing the voltage on said bus to a fixed DC voltage, said DC voltage chosen to be higher than the voltage on said bus when more than one trunk is connected to said bus.

* * * * *